(12) United States Patent
Baltasar Badaya

(10) Patent No.: US 10,978,978 B2
(45) Date of Patent: Apr. 13, 2021

(54) METHOD OF ESTIMATING AN OPERATING STATE OF A DRIVE SYSTEM AND DRIVE SYSTEM

(71) Applicant: Roche Diagnostics Operations, Inc., Indianapolis, IN (US)

(72) Inventor: Raul Baltasar Badaya, Stuttgart (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 16/654,491

(22) Filed: Oct. 16, 2019

(65) Prior Publication Data
US 2020/0136542 A1   Apr. 30, 2020

(30) Foreign Application Priority Data

Oct. 30, 2018 (EP) ..................................... 18203477

(51) Int. Cl.
*H02P 21/20* (2016.01)
*H02P 29/40* (2016.01)
*G05B 23/02* (2006.01)

(52) U.S. Cl.
CPC .......... *H02P 21/20* (2016.02); *G05B 23/0283* (2013.01); *H02P 29/40* (2016.02); *H02P 2203/07* (2013.01); *H02P 2203/11* (2013.01)

(58) Field of Classification Search
None
See application file for complete search history.

(56) References Cited

U.S. PATENT DOCUMENTS

| | | | | |
|---|---|---|---|---|
| 3,924,562 A | * | 12/1975 | Harris | ................ B05B 13/0228 118/320 |
| 3,998,316 A | * | 12/1976 | Kamm | .................... B23P 23/06 198/346.1 |
| 6,123,028 A | * | 9/2000 | Bellezza | ................ B65G 37/02 104/172.3 |
| 7,653,512 B2 | | 1/2010 | Cheung et al. | |
| 2003/0230200 A1 | * | 12/2003 | Cheung | ................. A47J 37/045 99/419 |
| 2011/0190984 A1 | | 8/2011 | Reeve | |

FOREIGN PATENT DOCUMENTS

| | | |
|---|---|---|
| CN | 1166722 A | 12/1997 |
| CN | 1199832 C | 5/2005 |
| CN | 1963702 A | 5/2007 |
| CN | 101820248 A | 9/2010 |

(Continued)

*Primary Examiner* — Bentsu Ro
(74) *Attorney, Agent, or Firm* — Roche Diagnostics Operations, Inc.

(57) ABSTRACT

A method of estimating an operating state of a drive system is presented. The drive system comprises an electric motor and a mechanical unit being moved by the electric motor. The method comprises a) operating the electric motor using electrical properties, b) determining movement properties regarding the movement of the mechanical unit using the electrical properties, repeating steps a) and b) for a number of times using changed electrical properties, and generating a distribution function. The distribution function allocates electrical properties to the resulting movement properties. The method also comprises estimating the operating state in response to the generated distribution function.

12 Claims, 1 Drawing Sheet

(56) References Cited

FOREIGN PATENT DOCUMENTS

| | | |
|---|---|---|
| CN | 103069713 A | 4/2013 |
| CN | 108027404 A | 5/2018 |
| CN | 1267954 A | 9/2020 |
| JP | 2006-076782 A | 3/2006 |
| JP | 2009-083381 A | 4/2009 |
| WO | 2002/026602 A2 | 4/2002 |
| WO | 2010/027524 A1 | 3/2010 |
| WO | 2015/004361 A1 | 1/2015 |
| WO | 2017/095739 A1 | 6/2017 |

* cited by examiner

METHOD OF ESTIMATING AN OPERATING STATE OF A DRIVE SYSTEM AND DRIVE SYSTEM

CROSS-REFERENCE TO RELATED APPLICATIONS

This application claims priority to EP 18203477.7, filed Oct. 30, 2018, which is hereby incorporated by reference.

BACKGROUND

The present disclosure generally relates to a method of estimating an operating state of a drive system and to a drive system.

There is a need for a method of estimating an operating state of a drive system and to a drive system allowing a reliable estimating of the operating state of the drive system.

SUMMARY

According to the present disclosure, a method of estimating an operating state of a drive system is presented. The drive system can comprise an electric motor and a mechanical unit being moved by the electric motor. The method can comprise a) operating the electric motor using electrical properties, b) determining movement properties regarding the movement of the mechanical unit using the electrical properties, repeating steps a) and b) for a number of times using changed electrical properties, and generating a distribution function. The distribution function can allocate the electrical properties used to the resulting movement properties. The method can also comprise estimating the operating state in response to the generated distribution function.

Accordingly, it is a feature of the embodiments of the present disclosure to provide for a method of estimating an operating state of a drive system and to a drive system allowing a reliable estimating of the operating state of the drive system. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
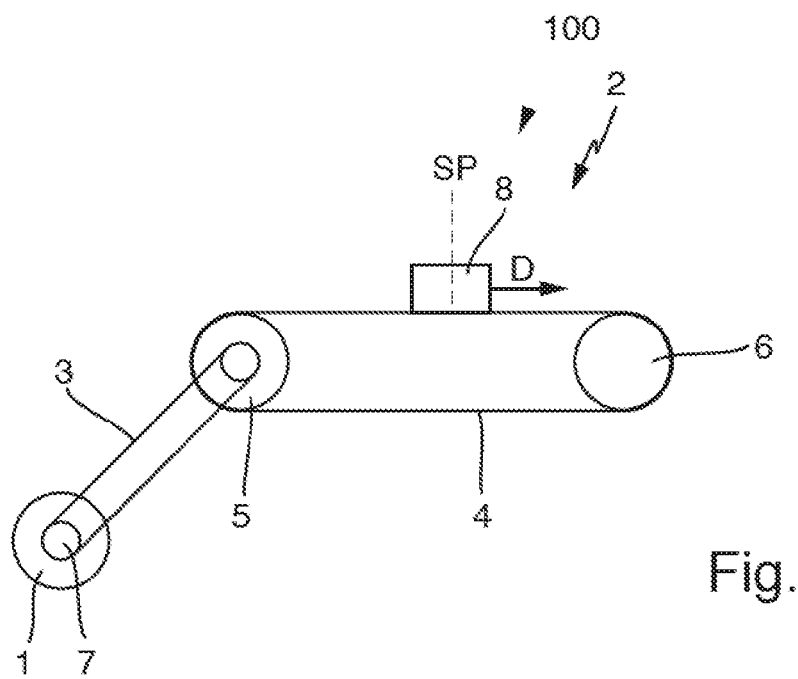
FIG. 1 illustrates highly schematically an exemplary drive system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The presented method serves to estimate an operating state of a drive system. The drive system can comprise at least one electric motor and a mechanical unit being moved or driven by the electric motor. The mechanical unit may comprise all kind of conventional mechanical components such as, for example, a gearing, transmission means, mechanical guidance means, mechanical couplings, and the like.

The method can comprise the following steps.

Step a), operating the electric motor using defined electrical properties such as, for example, a set of electrical properties, such that the mechanical unit performs a movement in response to the used electrical properties and in response to the state of the drive system.

Step b), determining movement properties regarding the movement of the mechanical when unit using the defined electrical properties.

Step c), repeating steps a) and b) for a number of times using defined but changed electrical properties.

Step d), generating a distribution function, wherein the distribution function allocates for each of the used and defined electrical properties the resulting movement properties.

Step e), estimating the operating state in response to the generated distribution function. The operating state may, for example, be estimated in response to the shape and/or the height and/or the latitude and/or an extremum and/or a gradient and the like of the generated distribution function.

The present disclosure is based on the finding that the distribution function can be specific for the operating state of the drive system.

According to an embodiment, the electrical properties can comprise or can be a torque provided by the electric motor. For example, the torque provided by the electric motor may be changed. For each torque value used, the corresponding movement properties can be determined to generate the distribution function.

According to an embodiment, the electrical properties can comprise or can be a current applied to the electric motor. For example, the current applied to the electric motor may be changed. For each current value used, the corresponding movement properties can be determined to generate the distribution function.

According to an embodiment, the movement properties can comprise or can be a duration needed to move the mechanical unit for a given distance.

According to an embodiment, the movement properties can comprise or can be a distance covered or made by the mechanical unit for or during a given duration.

According to an embodiment, the movement properties can comprise or can be a maximum speed of the mechanical unit. The maximum speed can be achieved using the electrical properties.

According to an embodiment, steps a) and b) can be repeated between about 5 to about 100 times using changed electrical properties.

According to an embodiment, steps a) to d) can be repeated for different points in time. For each point in time, a corresponding distribution function can be stored. The operating state can be estimated based on the stored distribution functions.

According to an embodiment, if a difference between the stored distribution functions is larger than a threshold value, the operating state can be estimated such that maintenance can be requested. The difference may, for example, be calculated as a means square deviation. In one embodiment, a difference between a reference distribution function denoting an error free drive system and an actual distribution function may be calculated to estimate a maintenance request.

According to an embodiment, the operating state can comprise at least one of the group comprising of: wear (level) state, need for maintenance state, frictional resistance state, mechanical malfunction of components comprised in the mechanical unit, and misalignment of components comprised in the mechanical unit. The operating state may further comprise specific maintenance needs or problems such as, for example, high friction in a bearing or deformation of a mechanical part.

According to an embodiment, the electrical properties can be chosen between an upper limit which can depend on a maximum run-time power of the electric motor and a lower limit which can depend on a minimum power of the electric motor required for a movement of the mechanical unit.

The drive system can comprise an electric motor, and a mechanical unit being moved by the electric motor. The drive system can be configured to perform the above described method.

By the present disclosure, a predictive maintenance can be provided, for example, determining whether the drive system needs to be maintained, inspected or fixed before significant damage happens.

For each electric motor of the drive system, the following steps may be performed. First, a number of different current values and/or torque values that can be applied to the motor can be defined. The sensitivity and the resolution of the method can depend on the number of different current values and/or torque values used. When the system is in a known functional state, all the different current values and/or torque values can be sequentially applied to the electric motor. Each movement caused by applying the different current values and/or torque values to the electric motor can start at the same starting point. Further, either a moving distance or a moving time for the movement can remain constant for each applied current value and/or torque value. Each resulting moving distance or each resulting moving time can be saved thus resulting in a reference distribution function allocating different current values and/or torque values to the corresponding moving distance and/or corresponding moving time for the known functional state.

These steps may be repeated periodically. The resulting distribution functions can be compared with the reference distribution function and/or with one another to decide whether the drive system may need to be serviced. The decision on whether maintenance is needed or not may be taken based on learning from data of similar devices.

Using different current values/torque values to determine the distribution functions can allow the method to provide different sensitiveness to a specific issue in the drive system. As an example, an increment of the resistance to the movement (for example, due to misalignment of mechanical parts) can have a higher impact in movements with low power than in movements with high power. In the same way, a decrement of the resistance to the movement (for example, due to wear of mechanical parts) can have a higher impact in movements with high power than in movements with low power.

Referring initially to FIG. 1, FIG. 1 highly schematically depicts an exemplary drive system 100 comprising an electric motor 1 and a mechanical unit 2 being moved or driven by the electric motor 1.

The mechanical unit 2 can comprise a first belt 3, a second belt 4, a first wheel 5 and a second wheel 6. The second belt 4 can run around the wheels 5 and 6. The first wheel 5 can be coupled to a motor shaft 7 of the electric motor 1 by the first belt 3 such that the electric motor 1 may cause a horizontal movement of an article 8 to be conveyed.

It can be understood, that the drive system 100 and the mechanical unit 2 are exemplary only and the present disclosure may be used within more complex drive systems 100, for example, having more than one electric motor and/or having other forms of mechanical units.

By use of the present disclosure, it can be possible to estimate an operating state of the drive system 100, for example, to estimate a wear level of used components, frictional resistance of, for example, bearings of the wheels 5 and 6, mechanical malfunction of the components 3 to 6 comprised in the mechanical unit 2, and misalignment of the components 3 to 6 comprised in the mechanical unit 2.

In order to estimate the operating state of the drive system 100, the following steps can be performed.

First, a number of different current values that can be applied to the electric motor 1 can be defined. The number of current values may, for example, comprise about 100 different current values, for example, ranging between about 1 A and about 10 A. The different current values may have an equal distance between adjacent current values. Self-evidently, these values are to be understood as examples.

After the drive system 100 is brought into a known functional state, for example, by servicing the drive system 100 or after an initial installation, all the different current values of the number of current values can be sequentially applied to the electric motor. The drive system 100 can be load-free, that is, the object 8 can be removed.

Each movement caused by applying one of the current values to the electric motor 1 can start at the same starting point SP. Further, a moving time for each movement caused by applying one of the different current values to the electric motor 1 can remain constant. The moving time may, for example, be about 5 seconds. Each resulting moving distance D can then be saved.

Figure 2:
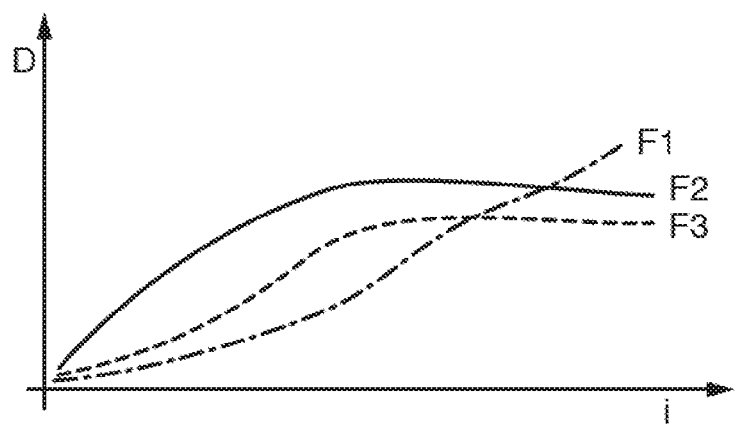
FIG. 2 illustrates schematically a number of distribution functions allocating moving distances to motor currents according to an embodiment of the present disclosure.

FIG. 2 depicts a resulting reference distribution function F1 allocating different current values I (x axis) to the corresponding moving distance D (y axis). The distribution function F1 can be specific for a proper or intended function of the drive system 100.

Distribution function F2 has been determined correspondingly after about 100 hours of operation and distribution function F3 has been determined correspondingly after about 500 hours of operation.

After about 500 hours of operation, the drive system 100 may need maintenance. The distribution function F3 can be specific for these maintenance needs. Thus, it can be possible to estimate, for example, the need for maintenance by the distribution functions F.

The method may, for example, be trained, for example, by assigning determined (in real or simulated) distribution functions F to defined operating states of the drive system 100.

Figure 3:
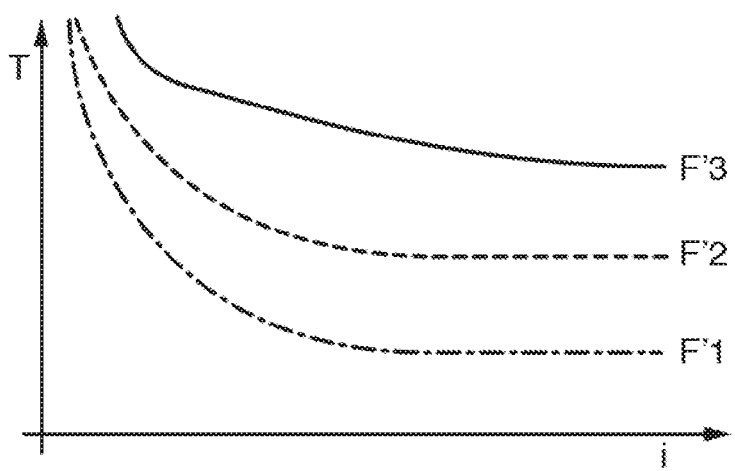
FIG. 3 illustrates schematically a number of alternative distribution functions allocating moving times to motor currents according to an embodiment of the present disclosure.

FIG. 3 depicts alternative distribution functions F'1, F'2 and F'3 allocating different current values I (x axis) to a corresponding duration T (y axis) needed to move the mechanical unit 2 for a given distance D.

The distribution function F'1 can be specific for a proper or intended function of the drive system 100.

Distribution function F'2 has been determined correspondingly after about 100 hours of operation and distribution function F'3 has been determined correspondingly after about 500 hours of operation.

As depicted, the time T needed to move the mechanical unit 2 for the same given distance D can increase with increasing operation time.

Thus, it can be possible to estimate, for example, the need for maintenance by the distribution functions F'.

The method may, for example, be trained, for example, by assigning determined (in real or simulated) distribution functions F or F' to defined operating states of the drive system 100.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method of estimating an operating state of a drive system, wherein the drive system comprises an electric motor and a mechanical unit being moved by the electric motor, the method comprises:
   a) operating the electric motor using electrical properties;
   b) determining movement properties regarding the movement of the mechanical unit using the electrical properties;
   c) repeating steps a) and b) for a number of times using changed electrical properties;
   d) generating a distribution function, wherein the distribution function allocates the electrical properties used to the resulting movement properties; and
   e) estimating the operating state in response to the generated distribution function.

2. The method according to claim 1, wherein the electrical properties comprise a torque provided by the electric motor.

3. The method according to claim 1, wherein the electrical properties comprise a current applied to the electric motor.

4. The method according to claim 1, wherein the movement properties comprise a duration needed to move the mechanical unit for a given distance.

5. The method according to claim 1, wherein the movement properties comprise a distance covered by the mechanical unit for a given duration.

6. The method according to claim 1, wherein the movement properties comprise a maximum speed of the mechanical unit.

7. The method according to claim 1, wherein steps a) and b) are repeated between 5 to 100 times using changed electrical properties.

8. The method according to claim 1, wherein steps a) to d) are repeated for different points in time, wherein, for each point in time, a corresponding distribution function is stored, and wherein the operating state is estimated based on the stored distribution functions.

9. The method according to claim 8, wherein if a difference between the stored distribution functions is larger than a threshold value, the operating state is estimated such that a maintenance is requested.

10. The method according to claim 1, wherein the operating state comprises at least one of the group comprising: wear level state, need for maintenance state, frictional resistance state, mechanical malfunction of components comprised in the mechanical unit, and misalignment of components comprised in the mechanical unit.

11. The method according to claim 1, wherein the electrical properties are chosen between an upper limit which depends on a maximum run-time power of the electric motor and a lower limit which depends on a minimum power of the electric motor required for a movement of the mechanical unit.

12. A drive system, the drive system comprises:
   an electric motor; and
   a mechanical unit being moved by the electric motor, wherein the drive system is configured to perform the method according to claim 1.

* * * * *